US009212670B2

(12) United States Patent

Mellet et al.

(10) Patent No.: US 9,212,670 B2
(45) Date of Patent: Dec. 15, 2015

(54) COMPOSITE ACCUMULATOR

(75) Inventors: Edward W. Mellet, Rochester Hills, MI (US); Carlos E. Marin, Oxford, MI (US); Charles K. Buehler, Lansing, MI (US); James B. Borgerson, Clarkston, MI (US); Leonid Basin, Farmington Hills, MI (US); Philip C. Lundberg, Keego Harbor, MI (US); Glenn E. Clever, Washington, MI (US); Gary H. Paelicke, Saline, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 598 days.

(21) Appl. No.: 13/368,940

(22) Filed: Feb. 8, 2012

(65) Prior Publication Data

US 2013/0199648 A1 Aug. 8, 2013

(51) Int. Cl.
*F16L 55/04* (2006.01)
*F15B 1/04* (2006.01)

(52) U.S. Cl.
CPC ...................................... *F15B 1/045* (2013.01)

(58) Field of Classification Search
USPC ...................................................... 138/30, 31
See application file for complete search history.

(56) References Cited

U.S. PATENT DOCUMENTS 2,440,065 A * 4/1948 Ashton ........................... 138/31
2,619,915 A * 12/1952 Ifield et al. ............... 137/565.13
2,809,666 A * 10/1957 Judd ............................... 138/31
3,230,976 A * 1/1966 Mercier .......................... 138/30
3,718,376 A * 2/1973 Bowler et al. ................. 303/179
3,893,486 A * 7/1975 Meyers ........................... 138/31
4,450,870 A * 5/1984 Vick ............................... 138/31
4,566,609 A * 1/1986 Hoffmeister .................. 222/130
4,714,094 A * 12/1987 Tovagliaro ...................... 138/31
4,953,591 A * 9/1990 Takagi et al. ............ 137/565.34
5,129,427 A * 7/1992 White et al. ..................... 138/30
5,447,142 A * 9/1995 Bailey ........................... 123/527
5,857,753 A * 1/1999 Gowda ........................ 303/116.4
5,984,059 A * 11/1999 Kurachi et al. ............... 188/318
6,065,814 A * 5/2000 Nishii et al. ............... 303/116.1
6,203,117 B1 * 3/2001 Starr et al. ...................... 303/87
8,656,959 B2 * 2/2014 Marin et al. ..................... 138/31
8,783,793 B2 * 7/2014 Terashima et al. ......... 303/115.1
2008/0308168 A1 * 12/2008 O'Brien et al. ................. 138/31
2011/0226371 A1 9/2011 Marin et al.
2013/0074967 A1 * 3/2013 Marin et al. ..................... 138/31
2014/0130924 A1 * 5/2014 Basin et al. ...................... 138/31

FOREIGN PATENT DOCUMENTS

JP 2011033111 A 2/2011

* cited by examiner

*Primary Examiner* — James Hook

(57) ABSTRACT

A composite accumulator includes a base having a closed end and an open end, the base having an inner surface that defines a cavity and having a fluid port in communication with the cavity for communicating a hydraulic fluid in and out of the cavity. A cover is disposed over the open end of the base and is secured to the base by a fastener. A piston is disposed within the base and the cover. The piston is sealed to the inner surface of the cover and is translatable along an axis. A biasing member is disposed within the base and the cover and located axially between the piston and the cover. The base and the cover are plastic.

20 Claims, 1 Drawing Sheet

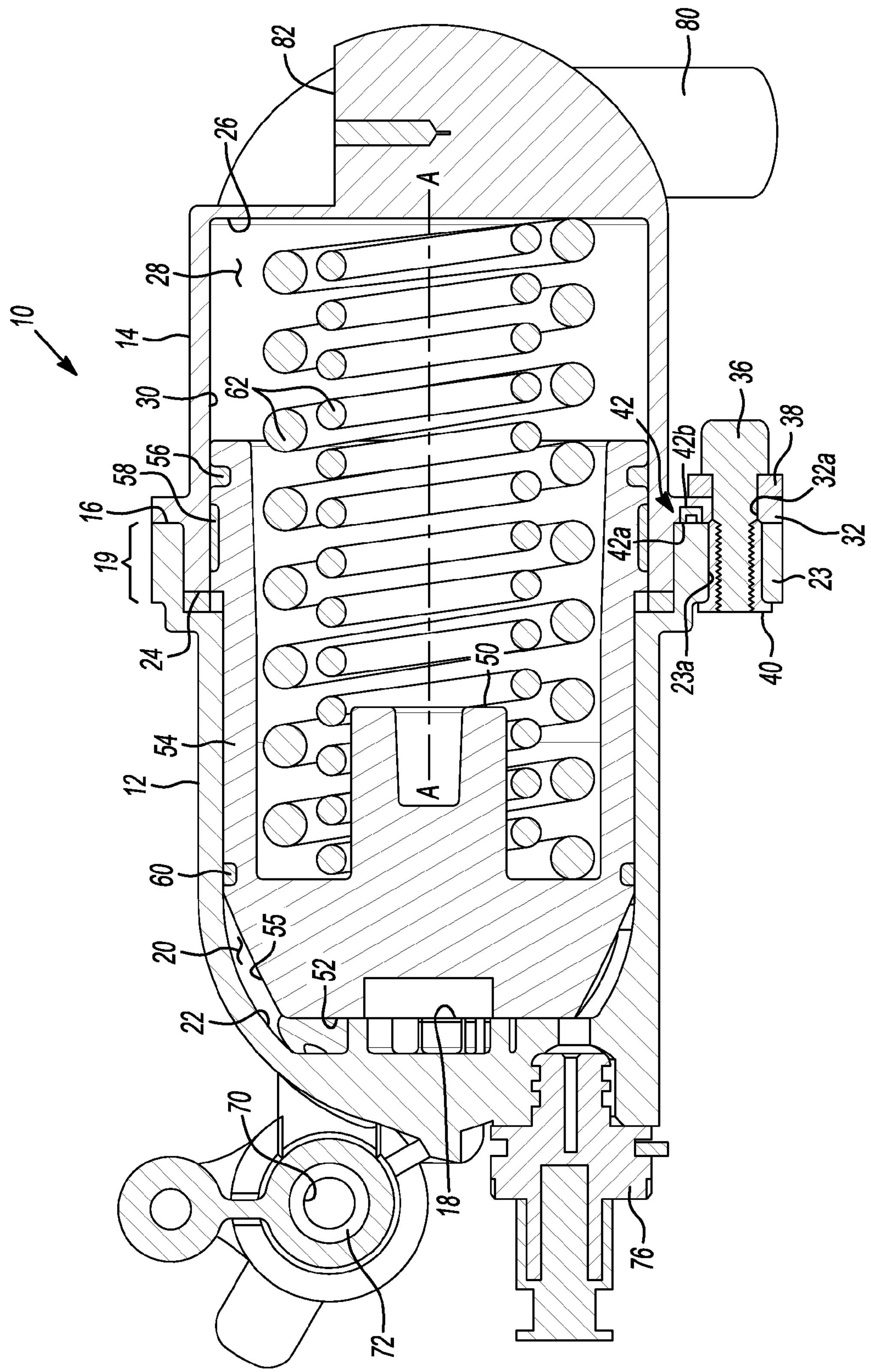
10
12
14
16
18
19
20
22
23
23a
24
26
28
30
32
32a
36
38
40
42
42a
42b
50
52
54
55
56
58
60
62
70
72
76
80
82
A
A

COMPOSITE ACCUMULATOR

FIELD

The present disclosure relates to a composite accumulator, and more particularly to a composite spring loaded accumulator configured for use in motor vehicle powertrains.

BACKGROUND

The statements in this section merely provide background information related to the present disclosure and may or may not constitute prior art.

A typical automatic transmission includes a hydraulic control system that is used to provide lubrication, cooling, and control to various components of the transmission. A pump circulates the hydraulic fluid under pressure throughout the transmission. The pump is typically driven by the engine of the motor vehicle. During stop and start conditions, it is desirable to turn off the engine in order to maximize fuel efficiency. However, turning off the engine in turn turns off the pump. In order to prime control devices within the transmission, such as clutches and brakes, an accumulator may be employed within the hydraulic control system to provide pressurized hydraulic fluid to the control devices so that the control devices may be engaged quickly without waiting for the pump to deliver pressure and flow. Current accumulator designs are manufactured from castings of aluminum in order to have sufficient strength. While these accumulator designs are useful for their intended purpose, there is room in the art for an accumulator comprised of a composite of materials without reducing the performance characteristics of the accumulator.

SUMMARY

A composite accumulator is provided for a motor vehicle. The composite accumulator includes a base having a closed end and an open end, the base having an inner surface that defines a cavity and having a fluid port in communication with the cavity for communicating a hydraulic fluid in and out of the cavity, a cover disposed over the open end of the base, wherein the cover is secured to the base by a fastener, a piston disposed within the base and the cover, the piston sealed to the inner surface of the cover and translatable along an axis, and a biasing member disposed within the base and the cover and located axially between the piston and the cover. The biasing member is configured to bias the piston towards the base. Both the base and the cover are made of a plastic material.

In one example of the present invention a support member is coupled to an outside surface of the cover to provide strength to the cover.

In another example of the present invention a pressure sensor is coupled to the base and is in communication with the cavity.

In another example of the present invention the pressure sensor is molded into the base.

In another example of the present invention a solenoid is coupled to the base and is in communication with the fluid port.

In another example of the present invention the fastener and the support member are metal.

In another example of the present invention the base includes a radial bracket and the cover includes a radial flange, and the fastener extends through the radial bracket and the radial flange.

In another example of the present invention the radial bracket and the radial flange each include a feature for concentrically aligning the base with the cover during assembly.

In another example of the present invention the feature includes a pilot pin and a pilot hole.

In another example of the present invention the piston includes a disc face and an axially extending rim portion and the disc face is oriented perpendicular to the axis and the rim portion extends towards the cover.

In another example of the present invention the rim portion has a distal end surface configured to contact the cover when the accumulator is fully charged with the hydraulic fluid.

In another example of the present invention the disc face has an outer diameter less than an outer diameter of the rim portion.

In another example of the present invention a first bushing is disposed between the piston and the base and a second bushing is disposed between the piston and the cover.

In another example of the present invention a seal is disposed radially between the piston and the cover and located axially between the second bushing and the cover.

Further areas of applicability will become apparent from the description provided herein. It should be understood that the description and specific examples are intended for purposes of illustration only and are not intended to limit the scope of the present disclosure.

DRAWING

The drawing described herein is for illustration purposes only and is not intended to limit the scope of the present disclosure in any way.

The drawing is a cross-sectional view of a composite accumulator according to the principles of the present invention.

DETAILED DESCRIPTION

The following description is merely exemplary in nature and is not intended to limit the present disclosure, application, or uses.

With reference to the drawing, an accumulator according to the principles of the present invention is generally indicated by reference number 10. The accumulator 10 is an energy storage device in which a non-compressible hydraulic fluid is held under pressure by an external source. In the example provided, the accumulator 10 is a spring type accumulator that provides a compressive force on the hydraulic fluid within the accumulator 10, as will be described in greater detail below. The accumulator 10 is preferably employed within the hydraulic control system of an automatic transmission (not shown) to enable stop-start operations or hybrid hydraulic operation, however, it should be appreciated that the accumulator 10 may be employed in various other environments, such as fuel injectors, air conditioning systems, etc., without departing from the scope of the present invention.

The accumulator 10 includes a base 12 and a cover 14. Both the base 12 and the cover 14 are made from a thermoplastic or thermoset polymeric material. Examples of polymeric materials for use with the accumulator 10 may include, but are not limited to nylons, polyethylene terephthalic, and Polybutene tera phthalic. The polymeric material may include fillers. The amount of filler is dependant upon stiffness at 150C, ranging from about 20 MPa to about 50 MPa, and in one embodiment, from about 30 MPa to about 40 MPa as measured by tensile stress strain method ISO 527. Examples of fillers suitable for use with the polymeric material include, but are not limited to, talc, mica, fiber glass, carbon fiber, and wood fiber. In one example the filler is present in the polymeric material from about 10% to about 60% by weight. In another example the filler material is present in an amount from about 20% to about 40% by weight.

The base 12 is generally cylindrical in shape and includes an open end 16 and a closed end 18 opposite the open end 16. The open end 16 preferably has a larger diameter than a diameter proximate the closed end 18 thereby forming an annulus 19 around the base 12. The open end 16 communicates with a fluid chamber or cavity 20 defined by an inner surface 22 of the base 12. In one example the inner surface 22 of the base 12 is molded using a precision minimum draft die or mandrel to achieve accuracy and straightness without requiring a machining operation. The base 12 further includes a radially extending bracket 23 proximate the open end 16.

The cover 14 is generally cylindrical in shape and includes an open end 24 and a closed end 26 opposite the open end 24. The open end 24 communicates with a cavity 28 defined by an inner surface 30 of the cover 14. In one example the inner surface 30 of the cover 14 is molded using a precision minimum draft die or mandrel to achieve accuracy and straightness without requiring a machining operation. The cover 14 further includes a radially extending flange 32 disposed proximate the open end 24.

The cover 14 is connected to the base 12 such that the open end 24 of the cover 14 fits within the annulus 19 of the open end 16 of the base 12 and the bracket 23 is radially aligned with the flange 32. Each of the bracket 23 and the flange 32 have a bolt hole 23A and 32A formed therethrough, respectively. In the example shown, a bolt 36 supported by a washer 38 is disposed through the bolt holes 23A and 32A to secure the cover 14 to the base 12. A threaded insert 40 may be disposed in the bolt hole 23A for receiving the bolt 36. It should be appreciated that any number of brackets 23, flanges 32, and bolts 36 may be employed to secure the cover 14 to the base 12 without departing from the scope of the present invention. Additionally, other mechanical fasteners, welds, and combinations thereof may be used to secure the cover 14 to the base 12. To assist in alignment of the cover 14 with the base 12 such that the cover 14 and the base 12 are concentric, one or more alignment features 42 may be located on the bracket 23 and the flange 32. For example, the alignment feature 42 may include a protuberance, bump, or pilot pin 42A extending from the bracket 23 that mates with a corresponding recess or pilot hole 42B located on the flange 32. Alternatively, to provide concentric alignment, the base 12 and the cover 14 may be formed using a solid molding die to provide an outer diameter of the cover 14 that slip fits with the inner diameter of the base 12.

A piston 50 is disposed within the cavities 20 and 28 between the base 12 and the cover 14. The piston 50 is translatable along an axis "A". The piston 50 includes a disc face 52 and an axially extending rim portion 54. The disc face 52 is disposed within the base 12 and the rim portion 54 extends towards the cover 14. The disc face 52 has an outer diameter that is less than the outer diameter of the rim portion 54. A sloped or angled surface 55 transitions between the disc face 52 and the rim portion 54. The angled surface 55 provides a gap or space between the piston 50 and the inner surface 22 of the base 12 when the disc face 52 abuts the closed end 18 of the base 12. This gap allows oil to move around the disc face 52 and assists in the oil having sufficient contact surface to apply a force on the piston 50, as will be described in greater detail below.

The piston 50 is slidably disposed within the base 12 and the cover 14 and has outer diameters approximately equal to the inner diameters of the base 12 and the cover 14. The piston 50 is sealed to the inner surface 30 of the cover 14 by a radial seal 56. A first bushing 58 is disposed between the piston 50 and the inner surface 30 of the cover 14. The first bushing 58 is arranged to be on the "wet" or oil side of the radial seal 56, i.e., the first bushing 58 is disposed between the cavity 20 and the radial seal 56. Disposing the first bushing 58 on the oil side of the radial seal 56 assures that the first bushing 58 is lubricated and does not translate dry on the inner surface 30 which can potentially damaging the cover 14. A second bushing 60 is disposed between the piston 50 and the inner surface 22 of the base 12. In the example provided, the bushings 58 and 60 are spaced axially as far apart as practical.

A pair of biasing members or springs 62 is disposed within the cavity 28 of the cover 14 between the closed end 26 and the piston 50. One end of the springs 62 contact the closed end 26 and another end of the springs 62 contact the piston 50 radially inwardly of the rim portion 54. The springs 62 bias the piston 50 towards the base 12.

The base 12 has an inlet/outlet port 70 that communicates with a solenoid 72 disposed in the base 12. The inlet/outlet 70 communicates with the cavity or fluid chamber 20. The solenoid 72 is operable to control the flow of oil in and out of the accumulator 50 by selectively closing and opening the inlet/outlet 70.

In one embodiment, the accumulator 10 further includes a pressure sensor 76 that communicates with the cavity or fluid chamber 20. The pressure sensor 76 is connected to the base 12. In a preferred embodiment the pressure sensor 76 is molded into the base 12 to increase the material compatibility between the pressure sensor 76 and the plastic base 12, however, the pressure sensor 76 may be threaded into the base 12 or may be bolted into the base 12 without departing from the scope of the present invention.

In another embodiment, the accumulator 50 is secured to a transmission housing or other component (not shown) by a metal bolt or other member 80. The bolt 80 is disposed through a bore 82 formed in the cover 14. The bolt 80 provides additional strength and support to the accumulator 50. The bolt 80 may be concentrically aligned with the bore 82 using guide pins or a molded slip fit, as described above.

During operation of the accumulator 10, the accumulator 10 is charged when pressurized hydraulic fluid or oil enters the fluid chamber 20 via the solenoid 72 and inlet/outlet 70 and contacts the piston 50. The pressurized oil creates a force on the disc face 52 of the piston and forces the piston 50 against the biasing force of the springs 62. When the rim portion 54 of the piston 50 contacts the closed end 26 of the cover 14, the piston 50 is in its maximum charged state. Accordingly, the forces acting on the pressure canister 12 are distributed on the closed end 26 where the springs 62 contact the closed end 26. This reaction force is then transferred to the bolts 36 and 80. By distributing the reaction forces of the piston 50 and springs 62 on the metal connections between the base 12 and cover 14 and between the accumulator 50 and a fixed mount, the stress on the base 12 and cover 14 is reduced and the base 12 and cover 14 are able to handle a greater force load. This allows the base 12 and cover 14 to be manufactured using a plastic molding without reducing the charge capacity of the accumulator 10. Increased manufacturing flexibility offers cost savings and additionally weight savings which in turn improve the efficiency of the motor vehicle. In addition, the base 12 and cover 14 may be precision molded to provide concentricity between the base 12 and the cover 14 through precise molded concentric relationships between the inner surfaces 22 and 30.

The description of the invention is merely exemplary in nature and variations that do not depart from the general essence of the invention are intended to be within the scope of the invention. Such variations are not to be regarded as a departure from the spirit and scope of the invention.

The invention claimed is:

1. An accumulator comprising:

a base having a closed end and an open end, the base having an inner surface that defines a cavity and having a fluid port in communication with the cavity for communicating a hydraulic fluid in and out of the cavity;

a cover disposed over the open end of the base, wherein the cover is secured to the base by a fastener;

a piston disposed within the base and the cover, the piston sealed to the inner surface of the cover and translatable along an axis;

a first bushing disposed radially between the piston and the base;

a second bushing disposed radially between the piston and the cover; and a biasing member disposed within the base and the cover and located axially between the piston and the cover, the biasing member configured to bias the piston towards the base; and a support member coupled to an outside surface of the cover, and wherein the base and the cover are a composite material.

2. The accumulator of claim 1 further comprising a pressure sensor coupled to the base and in communication with the cavity.

3. The accumulator of claim 2 wherein the pressure sensor is molded into the base.

4. The accumulator of claim 1 further comprising a solenoid coupled to the base and in communication with the fluid port.

5. The accumulator of claim 1 wherein the base and the cover are comprised of a polymeric material and the fastener and the support member are metal.

6. The accumulator of claim 1 wherein the base includes a radial bracket and the cover includes a radial flange, and wherein the fastener extends through the radial bracket and the radial flange.

7. The accumulator of claim 6 wherein the radial bracket and the radial flange each include a feature for concentrically aligning the base with the cover during assembly.

8. The accumulator of claim 7 wherein the feature includes a pilot pin and a pilot hole.

9. The accumulator of claim 1 wherein the piston includes a disc face and an axially extending rim portion, wherein the disc face is oriented perpendicular to the axis and the rim portion extends towards the cover.

10. The accumulator of claim 9 wherein the rim portion has a distal end surface configured to contact the cover when the accumulator is fully charged with the hydraulic fluid.

11. The accumulator of claim 9 wherein the disc face has an outer diameter less than an outer diameter of the rim portion.

12. The accumulator of claim 1 further comprising a seal disposed radially between the piston and the cover and located axially between the second bushing and the cover.

13. An accumulator comprising:

a base having a closed end and an open end, the base having an inner surface that defines a cavity and having a fluid port in communication with the cavity for communicating a hydraulic fluid in and out of the cavity;

a cover disposed over the open end of the base, wherein the cover is secured to the base by a fastener;

a piston disposed within the base and the cover, the piston sealed to the inner surface of the cover and translatable along an axis;

a biasing member disposed within the base and the cover and located axially between the piston and the cover, the biasing member configured to bias the piston towards the base;

a pressure sensor disposed within the base and in communication with the cavity; and a solenoid disposed within the base and in communication with the fluid port, the solenoid configured to control a flow of hydraulic fluid in and out of the cavity.

14. The accumulator of claim 13 wherein the pressure sensor is molded into the base.

15. The accumulator of claim 14 wherein the cover and the base are comprised of a polymeric material including a filler present in an amount from about 10% to about 60% by weight.

16. The accumulator of claim 13 wherein the base includes a radial bracket and the cover includes a radial flange, and wherein the fastener extends through the radial bracket and the radial flange.

17. The accumulator of claim 16 wherein the radial bracket and the radial flange each include a feature for concentrically aligning the base with the cover during assembly.

18. An accumulator comprising:

a base having a closed end and an open end, the base having an inner surface that defines a cavity and having a fluid port in communication with the cavity for communicating a hydraulic fluid in and out of the cavity;

a cover disposed over the open end of the base, wherein the cover is secured to the base by a fastener;

a piston disposed within the base and the cover, the piston translatable along an axis, wherein the piston includes a face and an axially extended rim, and an outer diameter of the face is less than an outer diameter of the rim and the rim is sealed to the cover;

a biasing member disposed within the base and the cover and located axially between the piston and the cover, the biasing member configured to bias the piston towards the base;

a pressure sensor disposed within the base and in communication with the cavity; and a solenoid disposed within the base and in communication with the fluid port, the solenoid configured to control a flow of hydraulic fluid in and out of the cavity.

19. The accumulator of claim 18 further comprising a first bushing disposed between the piston and the base and a second bushing disposed between the piston and the cover.

20. The accumulator of claim 18 wherein the inner surface of the base and an inner surface of the cover are molded using a precision minimum draft die or mandrel.

* * * * *